US007055030B2

(12) United States Patent
Negawa

(10) Patent No.: US 7,055,030 B2
(45) Date of Patent: May 30, 2006

(54) MULTICAST COMMUNICATION SYSTEM

(75) Inventor: Hideaki Negawa, Kawasaki (JP)

(73) Assignee: Fujitsu limited, Kawasaki (JP)

( * ) Notice: Subject to any disclaimer, the term of this patent is extended or adjusted under 35 U.S.C. 154(b) by 914 days.

(21) Appl. No.: 10/024,075

(22) Filed: Dec. 17, 2001

(65) Prior Publication Data

US 2003/0046539 A1 Mar. 6, 2003

(30) Foreign Application Priority Data

Aug. 29, 2001 (JP) ............................. 2001-258890

(51) Int. Cl.
*G06F 17/00* (2006.01)
(52) U.S. Cl. ....................... 713/163; 713/162; 713/150
(58) Field of Classification Search ................ 380/259, 380/278, 281, 282; 713/156, 161, 163, 165, 713/167, 171–174, 193, 150, 162
See application file for complete search history.

(56) References Cited

U.S. PATENT DOCUMENTS

2002/0002674 A1* 1/2002 Grimes et al. .............. 713/156

FOREIGN PATENT DOCUMENTS

| JP | 11-074882 | 3/1999 |
| JP | 2000-039840 | 2/2000 |

OTHER PUBLICATIONS

Schneier, "Applied Cryptography," Second Edition, John Wiley & Sons, 1996, pp. 31-33.*

Quisquater et al., "Secure Personalization Using Proxy Cryptography," Smart Card Research and Applications, vol. 1820 of Lecture Notes in Computer Science, 2000.*
McDaniel et al., "Antigone: A Flexible Framework for Secure Group Communication," 1999.*
Mittra, "Iolus: A Framework for Scalable Secure Multicasting," Proceedings of the ACM SIGCOMM '97, 1997.*
A dual encryption protocol for scalable secure multicasting; Dondeti, L.R.; Mukherjee, S.; Samal, A.; Computers and Communications, 1999. Proceedings. IEEE International Symposium on Jul. 6-8, 1999 pp.: 2-8.*
Comparison of scalable key distribution schemes for secure group communication; Dondeti, L.R.; Mukherjee, S.; Samal, A.; Global Telecommunications Conference, 1999. GLOBECOM '99 vol. 3, 1999 pp.: 1774-1778 vol. 3.*

(Continued)

*Primary Examiner*—David Jung
(74) *Attorney, Agent, or Firm*—Katten Muchin Rosenman LLP

(57) ABSTRACT

The present invention provides a multicast communication system having a multicast server and a plurality of clients belonging to a multicast group. The multicast server transmits data encrypted by using a first encryption key to the clients by multicasting, and transmits the result of encrypting the first encryption key by using a second encryption key by unicasting to a client subscribed to a data distribution service, among the plurality of clients. The client subscribed to the data distribution service receives the encrypted data and the result. The client decrypts the result to obtain the first encryption key and decrypts the encrypted data using the first encryption key.

18 Claims, 8 Drawing Sheets

OTHER PUBLICATIONS

Tunneling multicast traffic through non-multicast-aware networks and encryption devices; Higgins et al.; Military Communications Conference, 2001. MILCOM 2001. Communications for Network-Centric Operations: Creating the Information Force. IEEE; vol. 1, Oct. 28-31, 2001 pp.: 296-300 vol. 1.*

* cited by examiner

SUBSCRIBER LIST

| CLIENT NAME | KEY DECRYPTION KEY | DATE AND TIME OF SUBSCRIPTION |
|---|---|---|
| CLIENT A | Km(A) | T(A) |
| CLIENT B | Km(B) | T(B) |
| ⋮ | ⋮ | ⋮ |

| GROUP SESSION KEY | KEY UPDATING KEY |
|---|---|
| Kgr(1) | Ku(1) |
| Kgr(2) | Ku(2) |
| Kgr(3) | Ku(3) |
| ⋮ | ⋮ |
| Kgr(i) | Ku(i) |
| Kgr(i+1) | Ku(i+1) |
| ⋮ | ⋮ |

MULTICAST COMMUNICATION SYSTEM

BACKGROUND OF THE INVENTION

1. Field of the Invention

The present invention relates to a multicast communication system and specifically relates to a multicast communication system whereby data relating to a prescribed data distribution service is communicated by multicasting. Also, the present invention relates to a multicast data transmission device and multicast data receiving device.

2. Description of the Related Art

In the Internet or an intranet, the well-known technique of IP multicasting is available whereby the same data is distributed to a large number of clients (clients belonging to the multicast group). Such IP multicasting is suitable for distributing data (content) such as music or video on the Internet or an intranet. In future, as use of IP multicasting for contents distribution becomes common, it is anticipated that there will be a demand for the ability to levy data distribution service charges (reception charges) by imposing charges on clients.

In these circumstances, in order to levy charges appropriately, it will be necessary that, of clients belonging to an IP multicast group, clients that have subscribed to the data distribution service will be able to view and listen to the distributed data, but clients that have not subscribed to the data distribution service, although they will be able to receive the distributed data, will not be able to view and listen to it.

To achieve this, it is vital that the data distribution source should be able to definitively ascertain whether or not a client is subscribed to the data distribution service and an encryption technique for ensuring that only subscribed clients can view or listen to the distributed data is also vital.

Furthermore, since there will be a large number of receiving parties, a quantity-based method of charging appears desirable, in which charging is effected in accordance with the quantity of data received.

However, a presupposition of the encryption technique that is currently implemented on the Internet is that the data sending party and receiving party are in a one-to-one (unicast) relationship. No consideration has therefore been given to IP multicasting with a large number of receiving parties and the current situation in regard to IP multicasting is that the data are distributed in unencrypted form.

A conventionally employed quantity-based charging system is the pay-per-view system that is employed in CS broadcasts etc; however, in this system, charging is effected in program units. Consequently, even if viewing/listening is interrupted during the program, the charge for viewing the entire program is still applied. Strictly speaking, therefore, it cannot be said that charging is effected on the basis of the quantity of data received.

When images or music are distributed on the Internet, a more finely graduated charging system than the current pay-per-view is therefore demanded, which can cope with participation/withdrawal of receiving parties in units shorter than program units.

SUMMARY OF THE INVENTION

In view of the above, an object of the present invention is to enable encryption and decryption to be appropriately performed in multicast communications.

A further object of the present invention is to make it possible to ascertain which clients, of clients belonging to a multicast group, are subscribed to a data distribution service.

Yet a further object of the present invention is to perform quantity-based charging in suitable fashion.

In order to achieve the foregoing object, a multicast communication system according to a first aspect of the present invention is a multicast communication system having a multicast server for transmitting data relating to a prescribed data distribution service by multicasting, and a plurality of clients belonging to a multicast group and receiving said data, said multicast server comprising: a data encryption unit for encrypting said data by using a first encryption key; a data transmission unit for transmitting said data encrypted by said data encryption unit to said plurality of clients by multicasting; a key encryption unit for encrypting said first encryption key by using a second encryption key; and a key transmission unit for transmitting said first encryption key encrypted by said key encryption unit by unicasting to at least one of the plurality of clients, said at least one subscribing to said data distribution service; and said at least one client comprising: a key reception unit for receiving said encrypted first encryption key transmitted by said transmission unit; a key decryption unit for decrypting said encrypted first encryption key received by said key reception unit, using a decryption key; and a data decryption unit for decrypting the encrypted data transmitted by said data transmission unit, using the first encryption key obtained by said decryption unit.

A multicast data transmission device according to a first aspect of the present invention comprises: a data encryption unit for encrypting data relating to a prescribed data distribution service by using a first encryption key; a data transmission unit for transmitting said data encrypted by said data encryption unit by multicasting to clients belonging to a prescribed multicast group by multicasting; a key encryption unit for encrypting said first encryption key by using a second encryption key; and a key transmission unit for transmitting the first encryption key encrypted by said key encryption unit by unicasting to at least one of the clients belonging to said multicast group, said at least one client subscribing to said data distribution service.

A multicast data receiving device according to a first aspect of the present invention for receiving data relating to a prescribed data distribution service transmitted by multicasting comprises: a key decryption unit for decrypting a encrypted first encryption key obtained by subscribing to said data distribution service; a data reception unit for receiving said data encrypted by using said first encryption; and a data decryption unit for decrypting the encrypted data received by said data reception unit, by using the first encryption key obtained by decryption of said key decryption unit.

According to the first aspect of the present invention, the multicast server (or multicast data transmitting device) encrypts the first encryption key employed in encryption of the data, by using the second encryption key and transmits this by unicasting to at least one client (or multicast data receiving device) subscribing to the data distribution service. When the at least one client receives the encrypted first encryption key transmitted by unicasting, it decrypts this using a decryption key. Next, the multicast server encrypts the data using the first encryption key and transmits it by multicasting to clients belonging to the multicast group. When the client receives the encrypted data, it decrypts this using the first encryption key obtained by decryption of the decryption key.

According to the first aspect of the invention, data relating to the prescribed data distribution service is encrypted. Also, only at least one client subscribing to this service can decrypt the encrypted data and secrecy of the data is guaranteed in respect of clients that are not subscribed to this service. Consequently, data encryption can be appropriately performed in multicast communication.

A multicast communication system according to a second aspect of the present invention is a multicast communication system having a multicast server for transmitting data relating to a prescribed data distribution service by multicasting and a plurality of clients belonging to a multicast group and that receive said data, said multicast server comprising: a key updating unit for updating a data encryption key for encrypting said data, at intervals of a prescribed updating timing, to a data encryption key that is valid after the updating timing, said data encryption key that is valid after the updating timing being in a relationship that is obtained by applying an updating key corresponding to a data encryption key that is valid before the updating timing to the data encryption key that is valid before the updating timing; an updating key holding unit for generating or holding in advance said updating key; a data encryption unit for encrypting said data using a data encryption key that is valid currently; a data transmission unit for transmitting said data encrypted by said data encryption unit to said plurality of clients by multicasting; a key encryption unit for encrypting the updating key corresponding to the data encryption key that is valid after the updating timing, at intervals of said updating timing, using the data encryption key that is valid after the updating timing; and an updating key transmission unit for transmitting the updating key encrypted by said key encryption unit to at least one of said plurality of clients by unicasting or multicasting at intervals of said updating timing, said at least one client subscribing to said data distribution service; and said at least one client comprising: a data reception unit for receiving the encrypted data transmitted by said data transmission unit; a data decryption unit for decrypting said encrypted data received by said data reception unit, using a data decryption key that is valid currently that is the same as said data encryption key that is valid currently; an updating key reception unit for receiving the encrypted updating key transmitted by said updating key transmission unit; an updating key decryption unit for decrypting the encrypted updating key received by said updating key reception unit, using said data decrypting key that is valid currently; and a data decryption key updating unit for updating a data decryption key that is valid before said updating timing to a data decryption key that is valid after the updating timing, at intervals of the updating timing, said data decryption key that is valid after the updating timing being generated by applying an updating key obtained by decryption using a data decryption key that is valid before the updating time to said data decryption key that is valid before the updating timing, a data decryption key on subscribing to said data distribution service being given from outside.

A multicast data transmission device according to a second aspect of the present invention comprises: a key updating unit for updating a data encryption key for encrypting data relating to a prescribed data distribution service, at intervals of a prescribed updating timing, to a data encryption key that is valid after the updating timing, said data encryption key that is valid after the updating timing being in a relationship that is obtained by applying an updating key corresponding to a data encryption key that is valid before the updating timing to the data encryption key that is valid before the updating timing; an updating key holding unit for generating or holding in advance said updating key; a data encryption unit for encrypting said data using a data encryption key that is valid currently; a data transmission unit for transmitting said data encrypted by said data encryption unit to clients belonging to a prescribed multicast group by multicasting; a key encryption unit for encrypting the updating key corresponding to the data encryption key that is valid after the updating timing, at intervals of said updating timing, using the data encryption key that is valid after the updating timing; and an updating key transmission unit for transmitting the updating key encrypted by said key encryption unit to said at least one of clients by unicastinq or multicasting at intervals of said updating timing.

According to the second aspect of the present invention, the multicast server (or multicasting data transmission device) transmits the data to clients belonging to the multicast group by multicasting, after encrypting it using the currently valid data encryption key. The client receives the encrypted data transmitted from the multicast server and decrypts this encrypted data using the currently valid decryption key, which is the same as the currently valid data encryption key. The multicast server updates the data encryption key to a data encryption key that is valid after the updating timing and is in a relationship obtained by applying the updating key corresponding to the data encryption key valid before this updating timing to the data encryption key valid before this updating timing, at intervals of a prescribed updating timing. At intervals of the updating timing, the multicast server transmits the updating key corresponding to the data encryption key that is valid after the updating timing to the client by unicasting or multicasting, encrypting it using the data encryption key that is valid after this updating timing. The client receives the encrypted updating key transmitted from the multicast server and decrypts this encrypted updating key using the currently valid data decryption key. The client, on subscription to the data distribution service, updates the data decryption key that was valid before the updating timing to a data decryption key valid after the updating timing at intervals of the updating timing, by generating a data decryption key valid after the updating timing applied from outside and subsequently by applying the updating key obtained by decryption performed using the data decryption key valid before this updating timing to the data decryption key valid before this updating timing at intervals of the updating timing.

The same actions and effects as in the case of the first aspect described above can also be obtained with the second aspect of the present invention.

DESCRIPTION OF THE PREFERRED EMBODIMENTS

Embodiments of the present invention are described below with reference to the drawings. However, these are only examples and the technical scope of the present invention is not restricted to these.

First Embodiment

Figure 1:
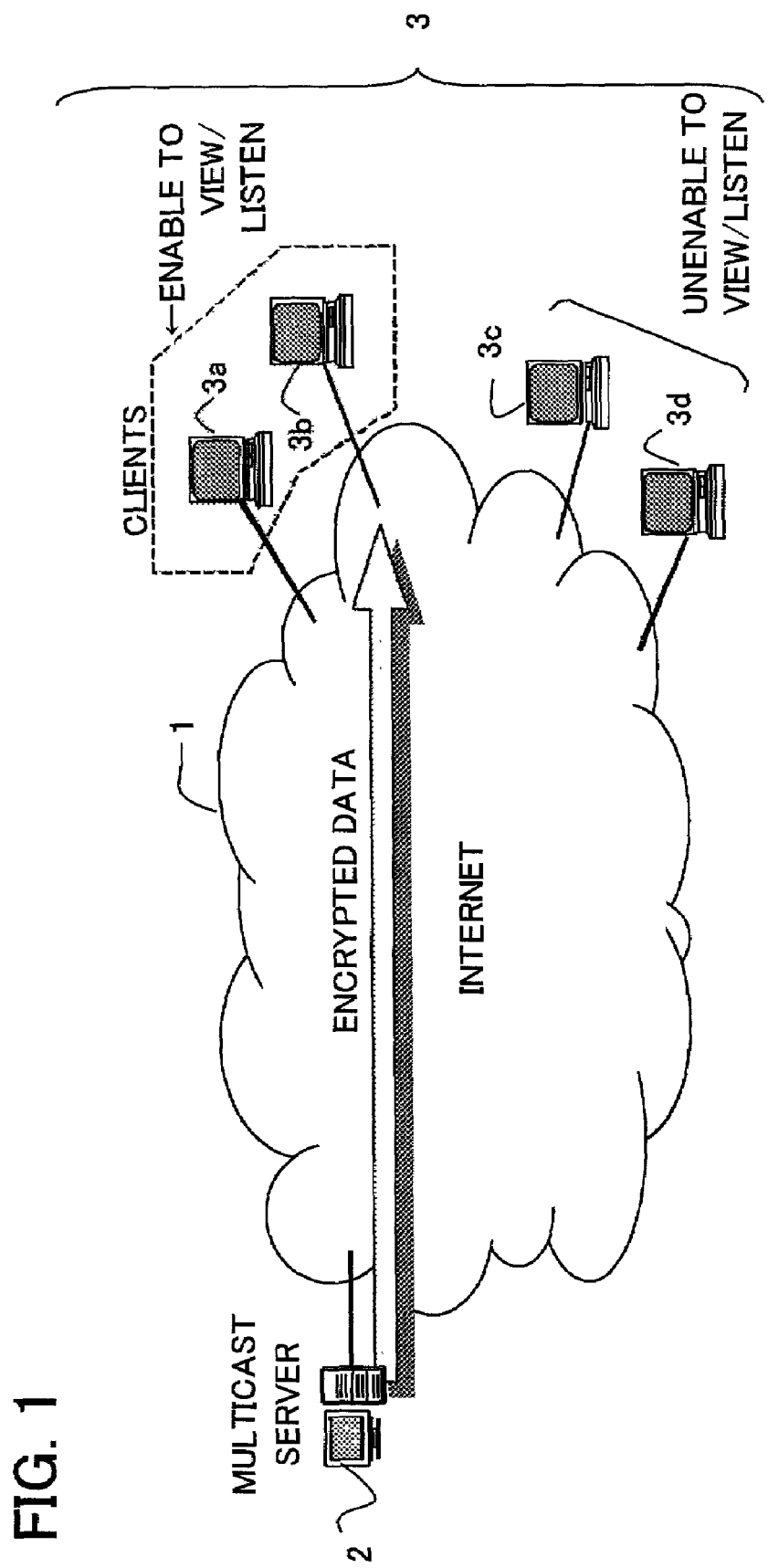
FIG. 1 is a block diagram illustrating the overall layout of a multicast communication system according to a first embodiment of the present invention.

FIG. 1 is a block diagram illustrating the overall layout of a multicast communication system according to a first embodiment of the present invention. This multicast communication system has a multicast server 2 connected to Internet 1, and a multicast group 3 having a plurality of clients 3a to 3d connected to Internet 1.

Multicast server (hereinafter simply called "server") 2 is a server that performs a data distribution service; it holds distribution data (content) such as music, video or text, and distributes this content through the Internet 1 to clients 3a to 3d belonging to multicast group 3 by IP multicastinq.

Clients 3a to 3d belong to multicast group 3 and receive distributed data transmitted by IP multicasting from server 2. In FIG. 1, the number of clients was taken as four by way of example, but could be a number other than four.

In this multicast communication system, it is arranged that, of the clients 3a to 3d belonging to the multicast group 3, only clients (subscribers) that have subscribed to the data distribution service of server 2 by means of a prescribed subscription procedure (to be described later) can receive this data distribution service. This is implemented by server 2 transmitting the distribution data in encrypted form, clients belong to multicast group 3 becoming subscribers of the data distribution service by going through a prescribed subscription procedure and acquiring a decryption key (this is a common key, hereinafter referred to as "group session key Kgr") for decrypting the encrypted distribution data.

That is, although all the clients of clients 3a to 3d can receive distribution data relating to the data distribution service from server 2 since they belong to multicast group 3, it is arranged that, unless they have become subscribers by going through a prescribed subscription procedure, they cannot view/listen to the distributed data by decrypting this received distributed data.

Also, in this multicast communication system, quantity-based charging is levied on the subscribers to the data distribution service. In this embodiment, this quantity-based charging is effected in accordance with time after subscribing to the data distribution service.

Server 2, clients 3a to 3d and the details of the processing which they perform are described below.

Figures 2, 3:
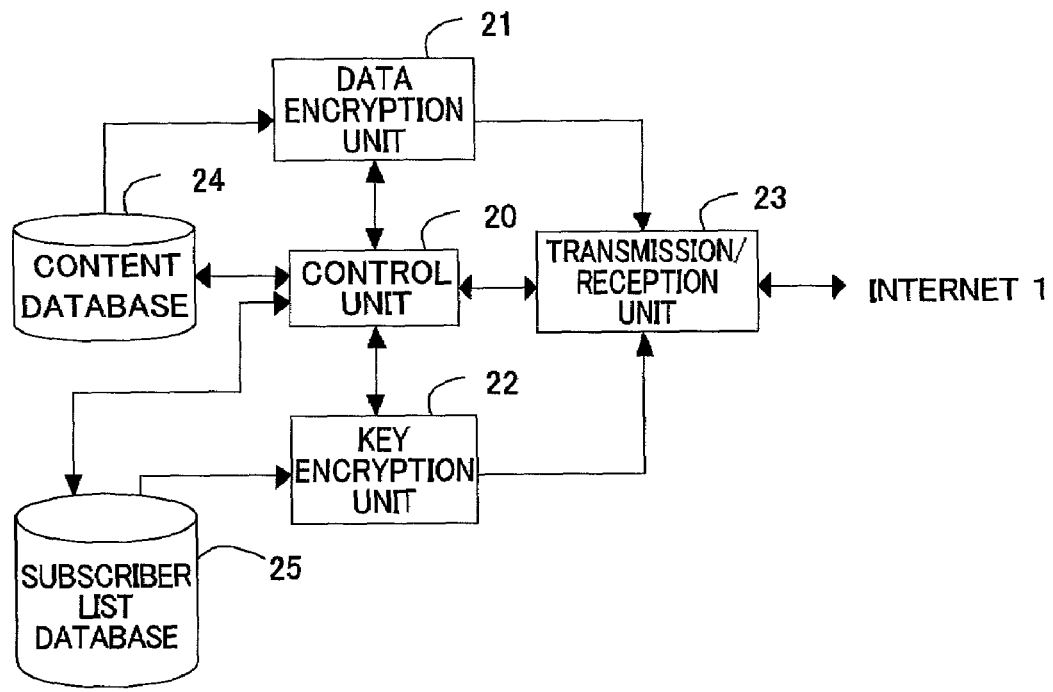
FIG. 2 is a block diagram illustrating the construction of server 2.
FIG. 3 shows a data structure of a subscriber list.

FIG. 2 is a block diagram illustrating the construction of server 2. Server 2 has a control unit 20, data encryption unit 21, key encryption unit 22, transmission/reception unit 23, content database 24 and subscriber list database 25.

Control unit 20 controls data encryption unit 21, key encryption unit 22, transmission/reception unit 23, content database 24 and subscriber list database 25 and performs processing such as processing of subscription and withdrawal of subscribers, as will be described in detail below, distribution of group session key Kgr on subscription, and quantity-based charging. Also, control unit 20 holds group session key Kgr and supplies group session key Kgr to this data encryption unit 21 and key encryption unit 22 on execution of encryption processing by data encryption unit 21 and key encryption unit 22.

Content database 24 is constituted by a storage device such as a hard disk or semiconductor memory or a recording medium such as a DVD or CD and reading device therefor and stores distribution data (content) transmitted to multicast group 3. This content database 24 supplies distribution data to data encryption unit 21 under the control of control unit 20.

Data encryption unit 21 receives the group session key (common key) Kgr from control unit 20 and, under the control of control unit 20, supplies distribution data from content database 24 to transmission/reception unit 23, encrypted using group session key Kgr. DES (data encryption standard) or the like is employed as the method of encryption. The group session key Kgr may be held by data encryption unit 21.

Subscriber list database 25 is constituted by a storage device such as a hard disk or semiconductor memory or a recording medium such as a DVD or CD and reading/writing device therefor and stores a subscriber list as shown in FIG. 3. The subscriber list is a list of clients, of clients 3a to 3d belonging to the multicast group 3, which have subscribed to the data distribution list of server 2 through the prescribed subscription procedure. The subscribers registered in this subscriber list are supplied with group session key Kgr from server 2 and can thereby decrypt the encrypted distribution data from server 2.

As shown in FIG. 3, each list cell of the subscriber list includes the subscriber name, key decryption key Km and date and time of subscription.

The "user name" is a name or identifier etc for uniquely identifying a given client from other clients; for example a unique user ID supplied to the subscriber by the provider of the data distribution service or the client's IP address etc could be employed as this user name.

The "key decryption key" is a common key for encrypting the group session key Kgr and for decrypting the encrypted group session key Kgr (hereinafter referred to as the "encrypted group session key Kgrx"). This key decryption key is also possessed by the subscriber. Preferably the subscribers are provided with respective individual decryption keys Km(A), Km(B) etc.

The "subscription date and time" are the date and time at which the subscriber subscribed to the data distribution service. In this embodiment, the fees to be collected from the subscribers (data distribution service fees) are calculated based on the time from the date and time of subscription to the date and time of withdrawal.

When a client belonging to multicast group 3 newly subscribes to the data distribution service, control unit 20 generates a new list cell and adds the generated list cell to the subscriber list. Conversely, when a client that is already subscribed withdraws from the data distribution list, control unit 20 deletes the list cell of the withdrawn subscriber from the subscriber list.

Key encryption unit 22 receives the group session key Kgr from control unit 20, reads the key decryption key Km of the transmission-end client from the subscriber list under the control of control unit 20, and encrypts the group session key Kgr using the key decryption key Km which has thus been read. As the method of encryption, DES (data encryption standard) or the like is employed. Key encryption unit 22 then supplies the encrypted group session key Kgrx that has been obtained by the encryption process to transmitting/reception unit 23. For example, if the group session key Kgr is transmitted to client 3a, key encryption unit 22 encrypts the group session key Kgr using key decryption key Km(A) of client 3a.

Transmitting/reception unit 23 constitutes an interface device with Internet 1. This transmitting/reception unit 23 sends data from data encryption unit 21 to clients belonging to multicast group 3 under the control of control unit 20 by IP multicasting through Internet 1 and sends the encrypted group session keys Kgrx from key encryption unit 22 to the clients by unicasting through Internet 1. Also, transmitting/reception unit 23 receives data sent from the clients belonging to the multicasting group 3 through Internet 1 and supplies this to control unit 20.

A distributed data receiving device (or adaptor) is mounted in clients 3a to 3d; this constitutes a hardware device for receiving distributed data from server 2. This distributed data receiving device is put in a condition whereby it can be purchased by any user by for example being sold on the market and is purchased in order to enable users of clients 3a to 3d to subscribe to the data distribution service. A key decryption key Km for decrypting an encrypted group session key Kgrx is stored beforehand in this distribution data receiving device.

Figure 4:
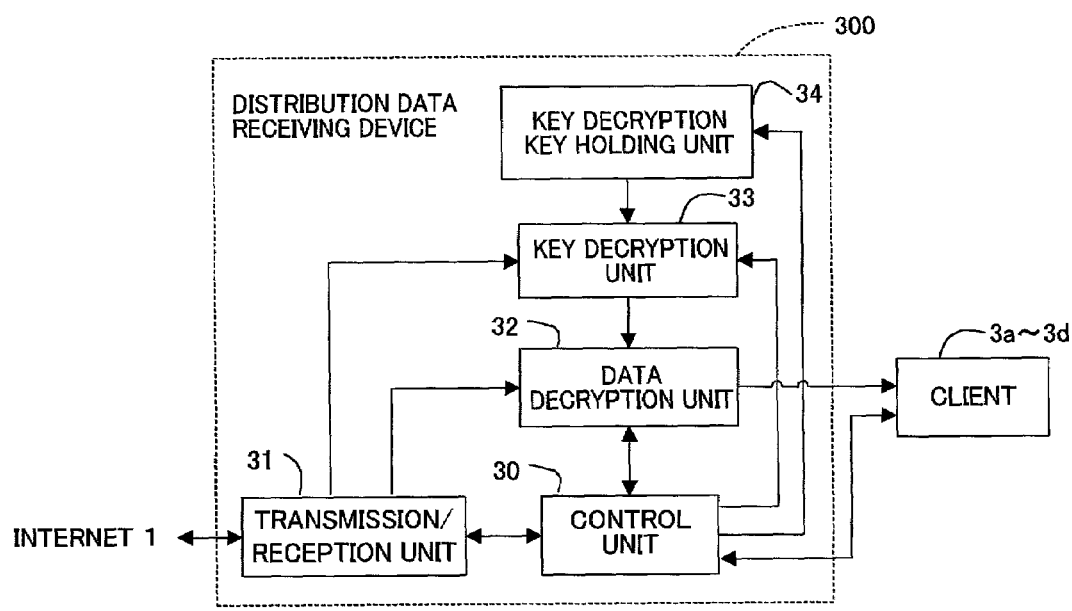
FIG. 4 is a block diagram illustrating the layout of a distribution data receiving device (or adaptor)

FIG. 4 is a block diagram illustrating the layout of a distribution data receiving device (or adaptor) 300. This distributed data receiving device 300 has a control unit 30, transmitting/reception unit 31, data decryption unit 32, key decryption unit 33 and key decryption key holding unit 34.

Control unit 30 controls transmitting/reception unit 31, data decryption unit 32, key decryption unit 33, and key decryption key holding unit 34 and, as will be described in detail later, also performs processing such as processing for entry and withdrawal of a subscriber and deletion (or destruction) of group session key Kgr and deletion (or destruction) of key decryption key Km on withdrawal.

Transmitting/reception unit 31 is an interface device with Internet 1 and transmits a reception request (to be described later) supplied from control unit 30 under the control of control unit 30 to server 2 through Internet 1. Also, transmitting/reception unit 31, under the control of control unit 30, receives incoming encrypted group session key Kgrx and encrypted distributed data (hereinbelow referred to as "encrypted distribution data") sent from server 2 through Internet 1 and respectively supplies these to key decryption unit 33 and data decryption unit 32.

Key decryption key holding unit 34 holds key decryption key Km. Key decryption key Km is preferably stored (formed) in key decryption key holding unit 34 in the form of a hardware circuit (for example an IC chip) to ensure that key decryption key Km cannot easily be read by a third party (third person, other people). Also, preferably, different key decryption keys Km are stored in each distribution data receiving device (i.e. client).

Key decryption unit 33 uses the key decryption key Km to decrypt the encrypted group session key Kgrx sent from server 2 and holds the group session key Kgr obtained by this decryption. It would be possible for data decryption unit 32 to hold group session key Kgr.

Data decryption unit 32 decrypts the encrypted distribution data sent from server 2 using the group session key Kgr that is held by key decryption unit 33 and supplies the distribution data obtained by decryption to a client where distribution data receiving device 300 is mounted. The client outputs the distribution data to its display device (CRT display, liquid crystal display etc) and to its speakers etc. The user of the client can thereby view/listen to etc the distributed data. The distributed data may be stored in a storage device (not shown) such as the client's hard disk, before being output.

As will be described, the key decryption key Km that is stored in key decryption key holding unit 34 and the group session key Kgr that is held by key decryption unit 33 are deleted (or destroyed) by control unit 30 in response to withdrawal of the client from the data distribution service.

Figure 5:
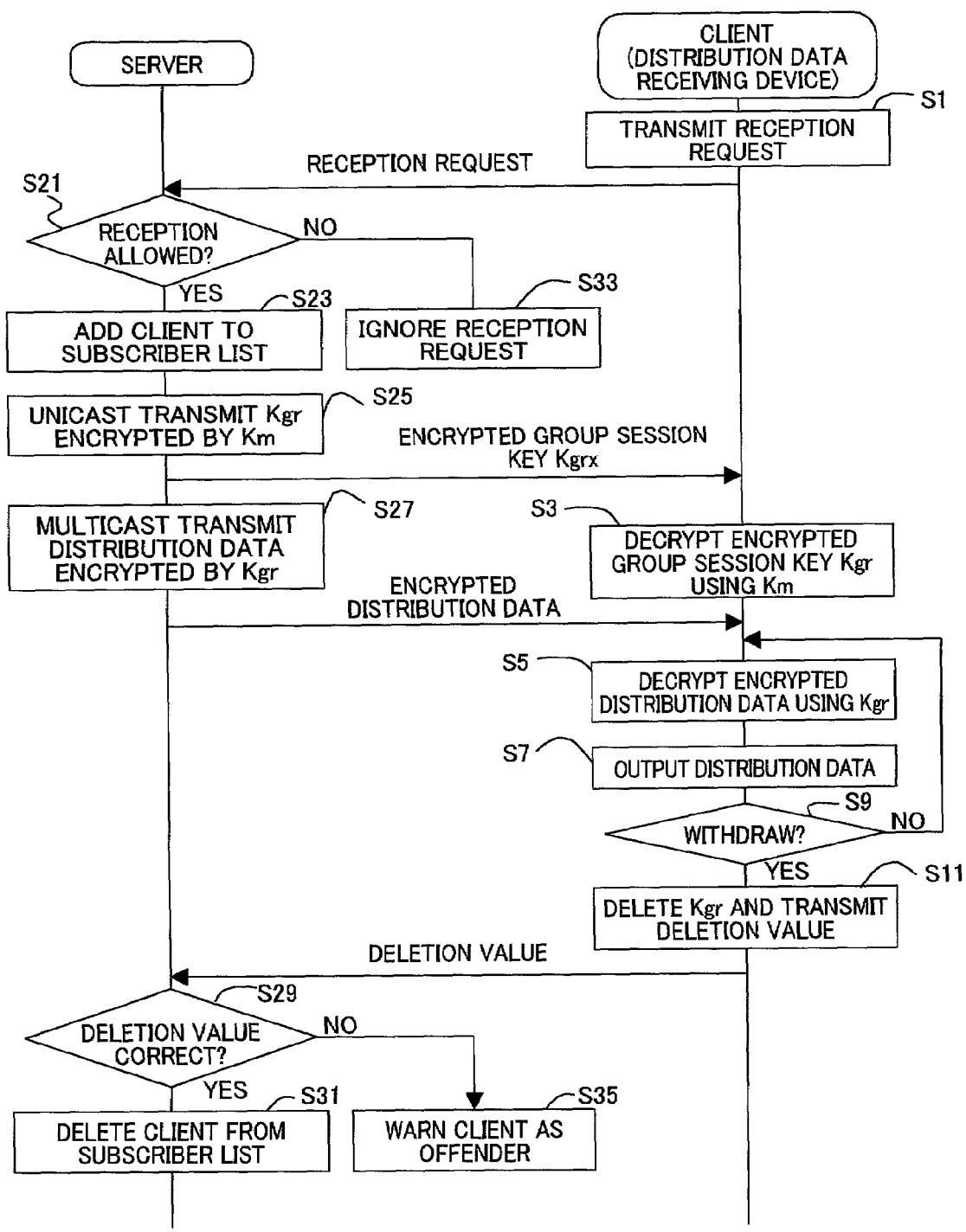
FIG. 5 is a sequence diagram showing the flow of processing of a server and a client belonging to a multicast group.

FIG. 5 is a sequence diagram showing the flow of processing of server 2 and a client (in this case, this will be assumed to be client 3c) belonging to multicast group 3. The processing shown in this sequence diagram describes the case where a client 3c that has not yet subscribed to the data distribution service of server 2 subscribes to this data distribution service.

At first, since client 3c is not subscribed to the data distribution service, it is in the condition that although encrypted distribution data sent by server 2 can be received, this cannot be decrypted.

In this condition, first of all, the user of client 3c purchases a distribution data receiving device 300 and mounts this in client 3c. It is to be assumed that key decryption key Km(C) is stored in distribution data receiving device 300 mounted in client 3c.

In response to mounting distribution data receiving device 300 in client 3c, as the data subscription service subscription procedure, control unit 30 transmits a reception request to server 2 (step S1) through transmitting/reception unit 31 and Internet 1. This reception request includes the client name of client 3c and an equipment number (identification number/serial number) for uniquely identifying distribution data receiving device 300 mounted in client 3c from other distribution data receiving devices.

This equipment number may be stored beforehand in control unit 30 and transmitted by control unit 30, or a number pasted onto the substrate etc of distribution data receiving device 300 may be input from client 3c by the user of client 3c and transmitted by control unit 30. Also, server 2 is informed of this equipment number from the sales point immediately after purchase of distribution data receiving device 3 and stores it in control unit 20.

The reception request transmitted through the Internet 1 from client 3c is supplied to control unit 20 through transmitting/reception unit 23 (see FIG. 2) of server 2. Control unit 20 determines whether or not to allow reception (step S21) by ascertaining whether or not the equipment number contained in the reception request is that of which was informed from the sales point.

If the equipment number contained in the reception request is the same as that of which was informed from the sales point, control unit 20 allows reception (step S21: YES); otherwise, it does not allow reception (step S21: NO).

If reception is not allowed, control unit 20 ignores the reception request (step S33). The condition that client 3c is unable to view/listen to distribution data therefore continues.

If reception is allowed, control unit 20 generates a list cell of the subscriber list and adds this list cell that has been generated to the subscriber list of subscriber list database 25 (step S23). The client's name included in the reception request is stored in the client's name column of this list cell and the key decryption key ("Km(C)") stored in key decryption key holding unit 34 of distribution data receiving device 300 is stored in the key decryption key column. Also, as the subscription date and time, the date and time of the reception request (or the date and time of generation of the list cell or the date and time of registration in database 25 etc) are stored.

If the key decryption keys Km are different for each distribution data receiving device 300, equipment number/key decryption key association data associating the equipment numbers of distribution data receiving devices 300 and the key decryption keys Km stored in their key decryption key holding units 34 is stored beforehand in server 2 (for example control unit 20 or a storage unit, not shown). The key decryption key Km associated with the equipment number is thereby stored under the "key decryption key" of the list cell by control unit 20.

Next, key encryption unit 22 encrypts the group session key Kgr to encrypted group session key Kgrx using key decryption key Km(C), and sends the encrypted group session key Kgrx through transmitting/reception unit 23 to client 3c by multicasting (step S25).

When the transmitting/reception unit 31 of distribution data receiving device 300 receives the encrypted group session key Kgrx, it supplies the encrypted group session key Kgrx that has thus been received to key decryption unit 33. Key decryption unit 33 decrypts the encrypted group session key Kgrx using the key decryption key Km(C) held by key decryption key holding unit 34 and holds this decrypted group session key Kgr (step S5). The subscription procedure is thereby completed.

After this, data encryption unit 21 of server 2 encrypts the distribution data stored in content database 24, using group session key Kgr, and sends this to the multicast group 3 by IP multicasting through transmitting/reception unit 23 (step S27).

When transmitting/reception unit 31 of client 3c receives the encrypted distribution data, it supplies this encrypted distribution data to data decryption unit 32. Data decryption unit 32 decrypts the encrypted distribution data using the group session key Kgr held by key decryption unit 33, and supplies the decrypted distribution data to client 3c. If the distribution data contains video data, client 3c displays this video data on a display device; if it contains voice data, it outputs this voice from the speakers (step S7).

This processing of steps S5 and S7 is repeated until client 3c withdraws from the data distribution service (step S9: NO).

However, when client 3c does withdraw from the data distribution service (step S9: YES), the withdrawal request from client 3c is supplied to control unit 30. This withdrawal request is for example input by the user of client 3c by means of an input device (keyboard etc) of client 3c.

When control unit 30 receives a withdrawal request from client 3c, it deletes (or destroys) the key decryption key Km(C) held in key decryption key holding unit 34 and deletes (or destroys) the group session key Kgr held in key decryption unit 33. Also, with this deletion, control unit 30 generates a deletion value as data indicating that deletion has taken place (step S11).

As this deletion value, there may be employed for example the result of performing a prescribed calculation (calculation using a prescribed equation/hash calculation etc) on the equipment number and/or client IP address etc of distribution data receiving device 300. Also, if the distribution data is streaming data, with a number associated with each stream, the result of performing a prescribed calculation on this index number could also be employed as the deletion value. Furthermore, the result of performing a prescribed calculation on the date and time of transmission of the withdrawal request (when reception of the distribution data is completed) could also be employed as the deletion value. The prescribed calculation is executed by a hardware circuit (for example an IC chip) of distribution data receiving device 300, to ensure that it is not easy for a third party to learn what sort of calculation is executed.

Control unit 30 sends the deletion value that is generated, together with the client name, to server 2 through transmitting/reception unit 31 (step S11).

Since the key decryption key Km(C) and group session key Kgr have been deleted in distributed data receiving device 300, although client 3c can receive the encrypted distribution data, it is thereafter unable to decrypt these. As a result, the user of client 3c cannot view/listen to the distributed data.

Control unit 20 of server 2 determines (step S29) whether the deletion value is legitimate or not. This determination is performed by control unit 20 performing the same calculation as control unit 30 and comparing the result of this calculation with the received deletion value. If for example, as the deletion value, the result of performing a prescribed calculation on the equipment number is employed, control unit 20 performs the same calculation as control unit 30 on the equipment number of distribution data receiving device 300 (client 3c) that transmitted the deletion value and ascertains whether the deletion value is legitimate or not by comparing this calculated result with this deletion value.

Also, where the result of the performing a prescribed calculation on an index number or the result of performing a prescribed calculation on the data and time of termination of reception is employed as the deletion value, the determination may be made by performing a reverse calculation on the deletion value and ascertaining whether the result of the reverse calculation is appropriate or not. Since in this case it is possible to ascertain from the result of the reverse calculation (index number or date and time of termination of reception) to what point of the data stream reception by client 3c has been achieved or to ascertain the date and time of termination of reception, this can be used to perform quantity-based charging.

If the deletion value is legitimate (step S29: YES), control unit 20 finds the time of subscription to the service from the date and time of subscription of the list cell of client 3c and the data and time at which the deletion value was received, and calculates a quantity-based service fee in accordance with this time. This service fee is then charged to or collected from the user of client 3c. Charging and collection may be performed during the subscription period at fixed periods (for example of one month) and, on withdrawal, charging may be effected in accordance with the period from the time point at which charges were last levied prior to withdrawal up to the time point of withdrawal. Also, if the index value or the date and time of termination of reception is obtained from the deletion value, quantity-based charging may be effected using this index value or the date and time of termination of reception.

After this, control unit 20 deletes the list cell of client 3c from the subscriber list of subscriber list database 25. The result of this deletion is that service charges are no longer applied to client 3c.

If, on the other hand, the deletion value is not legitimate (step S29: NO), control unit 20 deems client 3c to be an offender and sends a warning to client 3c (step S35).

Thus, in this embodiment, in IP multicast communication, the distribution data is encrypted and only parties who have properly subscribed to the data distribution service can acquire the decryption key. Consequently, in IP multicasting, encryption is appropriately performed and, as a result, only parties that have properly subscribed to the data distribution service can view/listen to the distribution data, while secrecy of the data is guaranteed against other parties. Also, in this embodiment, management/control of subscribers to the data distribution service can be performed at server 2 that is the source of provision of the distribution data. Furthermore, with this embodiment, more finely graduated quantity-based charges can be applied than in the case of charging using the pay-per-view system.

It should be noted that, instead of obtaining the key decryption keys Km of the clients (distribution data receiving devices 300) of server 2 from the equipment number/key decryption key association data as described above, it would be possible for the distribution data receiving devices 300 to send their own key decryption keys Km to server 2 in a form encrypted using a public key Kp of server 2 and for server 2 to obtain these transmitted keys by decrypting them using secret key Ks. In this case, the need for equipment number/key decryption key association data to be provided in server 2 is eliminated. As a public key encryption system using such a public key and secret key, RSA (Rivest Shamir Adleman) or elliptical curve encryption etc may be employed.

Also, PKI (public key infrastructure) may be employed. Specifically, when each client subscribes to the data distribution service, it receives a digital certificate (set of public key and secret key) issued by the authorization office of the PKI. Thus, when server 2 receives a reception request from a client, it acquires the public key (client's public key) of this digital certificate and encrypts the group session key Kgr using this public key; the client that sent the reception request then decrypts the encrypted group session key Kgrx obtained by this encryption process using the secret key of the digital certificate and can thereby acquire the group session key Kgr.

Second Embodiment

Secrecy of the distribution data can be ensured by periodically updating the group session key Kgr.

Figure 6:
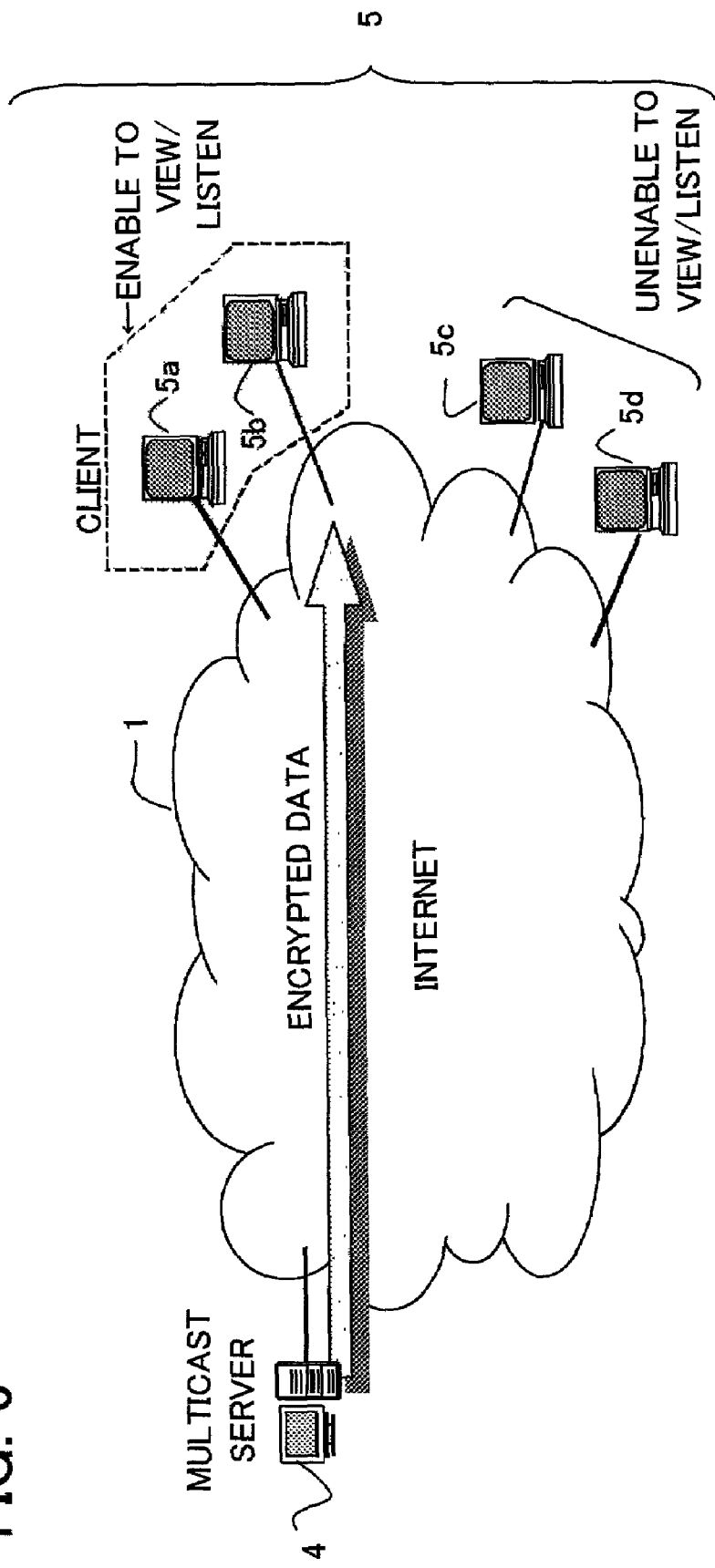
FIG. 6 is a block diagram illustrating the overall layout of a multicast communication system according to a second embodiment of the present invention.

FIG. 6 is a block diagram illustrating the overall layout of a multicast communication system according to a second embodiment of the present invention. This multicast communication system has a multicast server 4 connected to the Internet 1 and a multicast group 5 having a plurality of clients 5a to 5d connected to the Internet 1. The overall layout of this multicast communication system is the same as in the case of the first embodiment illustrated in FIG. 1, so a description of the overall layout of this multicast communication system will here be omitted.

Figure 7:
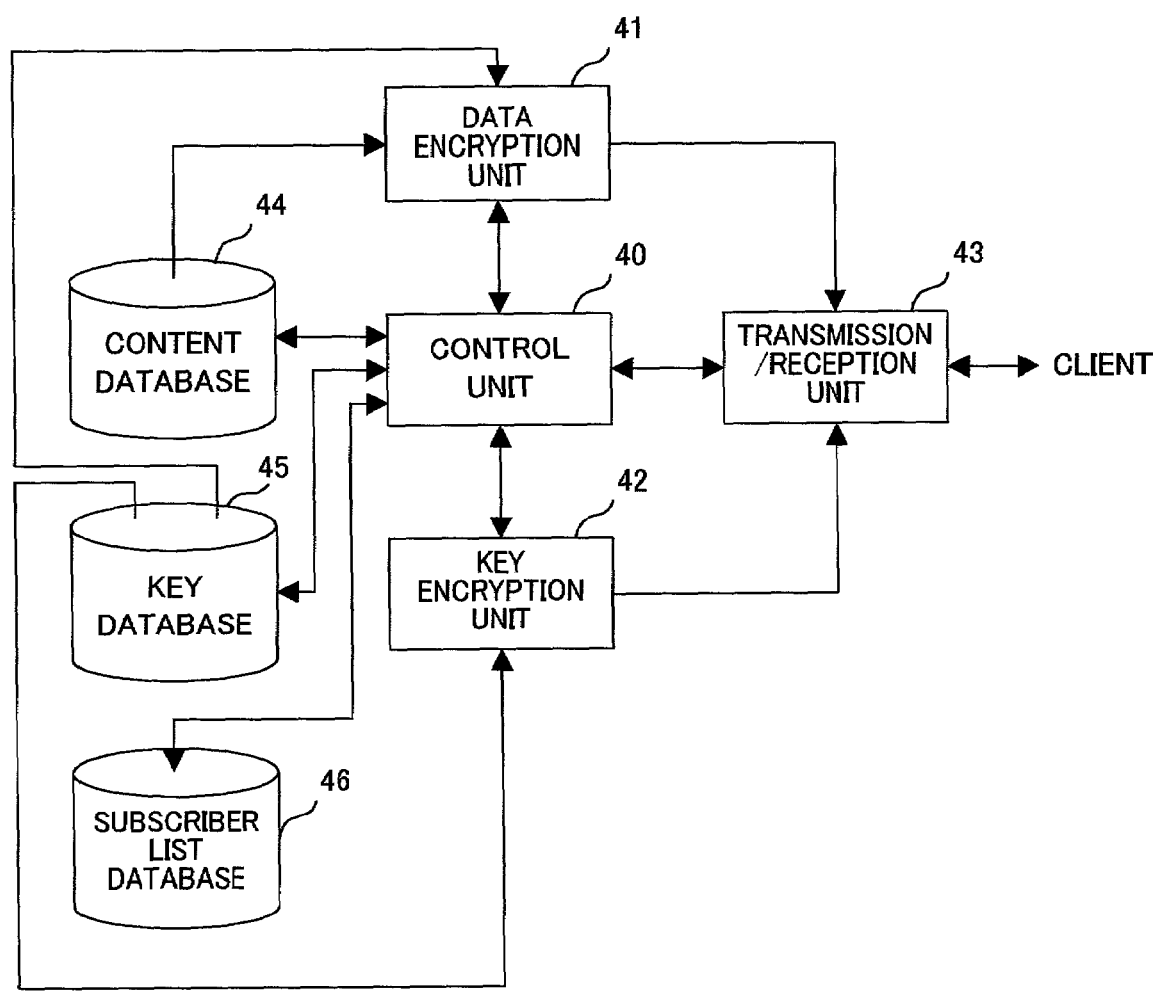
FIG. 7 is a block diagram illustrating the layout of a server according to the second embodiment.

FIG. 7 is a block diagram illustrating the layout of server 4 according to the second embodiment. Server 4 has a control unit 40, data encryption unit 41, key encryption unit 42, transmitting/reception unit 43, content database 44, subscriber list database 45 and key database 46.

Control unit 40 controls data encryption unit 41, key encryption unit 42, transmitting/reception unit 43, content database 44, key database 45 and subscriber list database 46 and performs processing such as processing for subscription and withdrawal of subscribers, as will be described in detail later, distribution of group session key Kgr on subscription, and quantity-based charging etc. Also, control unit 40 updates the group session key Kgr at intervals of a fixed time T1.

Content database 44 is similar to the content database 24 (see FIG. 2) in the first embodiment. The distribution data stored in this content database 44 is read and supplied to data encryption unit 41 under the control of control unit 40.

Data encryption unit 41 receives the group session key (common key) Kgr from control unit 40 and, under the control of control unit 40, encrypts the distribution data from content database 44 using group session key Kgr before supplying it to transmitting/reception unit 43. As the method of encryption, DES or the like may be employed. The group session key Kgr may be held by data encryption unit 41.

Subscriber list database 46 is constructed in the same way as subscriber list database 25 (see FIG. 2) in the first embodiment and stores a list of subscribers who have subscribed to the data distribution service through a prescribed subscription procedure. This subscriber list is practically the same as that of the first embodiment illustrated in FIG. 3, but, in this embodiment, the column "key decryption key Km" that is found in the first embodiment is not provided.

Figures 8, 9:
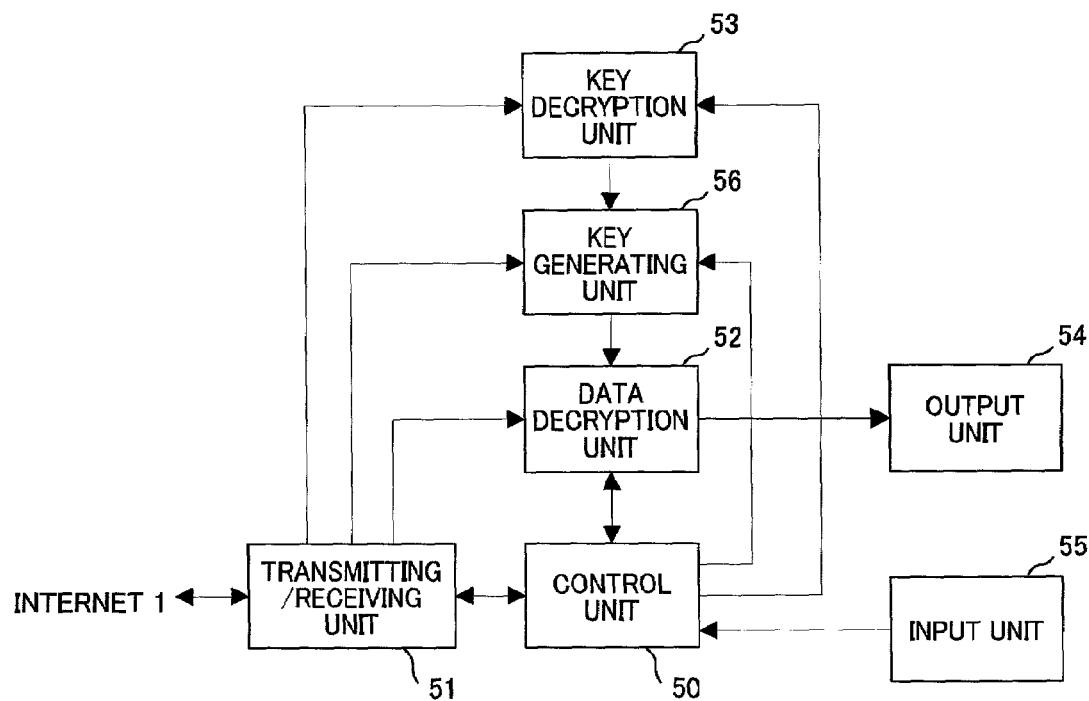
FIG. 8 shows key data whereby a plurality of group session keys Kgr and the key updating key Ku corresponding to each group session key Kgr are associated.
FIG. 9 is a block diagram illustrating the respective layouts of clients according to a second embodiment.

As shown in FIG. 8, the key database 45 holds key data whereby a plurality of group session keys Kgr and the key updating key Ku corresponding to each group session key Kgr are associated.

If symbol i is an arbitrary positive value, group session key Kgr(i+1) is obtained by applying the key updating key Ku(i) corresponding thereto to the group session key Kgr(i). An example of a process whereby this action may be performed is a process of calculation by substituting the group session key Kgr(i) and the key updating key Ku(i) in a prescribed equation (including processing whereby the group session key Kgr (i) is encrypted using key updating key Ku(i)). Group session key Kgr(1) is supplied beforehand to key database 45 as the initial value of the group session key.

The arrangement is such that, of the group of this plurality of group session keys Kgr, data encrypted using an arbitrary group session key Kgr(i) can only be decrypted using the same group session key Kgr(i) and cannot be decrypted using another group session key Kgr(j) (i j).

Control unit 40 updates group session key Kgr from Kgr(i) to Kgr(i+1) at intervals of a fixed time T1. Control unit 40 then, on this updating (with the updating timing) encrypts the key updating key Ku(i) using group session key Kgr(i), and sends the encrypted key updating key to the clients belonging to multicast group 5.

As the key updating keys Ku(i), new keys may be successively generated by control unit 40, or only a prescribed number n of keys may be prepared beforehand. In the former case, pseudo-random numbers or the like generated by for example a pseudo-random number generator may be employed as the new key updating keys. In the latter case, a cyclic arrangement is produced whereby the first group session key Kgr(1) is generated when the n-th group session key Kgr(n) acts on the key updating key Ku(n).

Also, it is not necessarily essential for a plurality of group session keys to be stored in key database 45: it would be possible to store only the currently active group session key Kgr (i.e. the group session key Kgr that is currently being employed for encryption of the distribution data). In this case, control unit 40 creates the next group session key Kgr(i+1) by applying the key updating key Ku(i) corresponding thereto to the currently active group session key Kgr (i) on the key updating.

Key encryption unit 42 receives the group session key Kgr(i) from control unit 40. Then, on updating of the group session key of control unit 40, key encryption unit 42 reads the key updating key Ku(i) corresponding to the group session key Kgr(i) from key database 45 and encrypts this using group session key Kgr(i) and supplies the encrypted key updating key Ku(i) (hereinbelow called "encrypted key updating key Kux(i)") to transmitting/reception unit 43. This encrypted key updating key Kux(i) is sent to the clients belonging to multicast group 5 from transmitting/reception unit 43 through Internet 1. DES or the like may be employed as the method of encryption.

Transmitting/reception unit 43 is an interface device with Internet 1 and sends the data from data encryption unit 41 or key encryption unit 42 to the clients belonging to the multicast group 5 through Internet 1 under the control of control unit 20 and receives incoming data sent through Internet 1 from the clients belonging to multicast group 5 and supplies this to control unit 40.

FIG. 9 is a block diagram illustrating the respective layouts of clients 5a to 5d according to a second embodiment. Since all the clients 5a to 5d have the same layout, only that of client 5c is described below as a typical example.

Client 5c has control unit 50, transmitting/reception unit 51, data decryption unit 52, key decryption unit 53, output unit 54, input unit 55 and key generating unit 56.

Control unit 50 controls transmitting/reception unit 51, data decryption unit 52, key decryption unit 53, output unit 54 and input unit 55 and performs processing such as processing of subscription and withdrawal of a subscriber, as will be described in detail later, and deletion (destruction) of group session key Kgr(i) on withdrawal.

Transmitting/reception unit 51 is an interface device with Internet 1 and transmits a reception request (to be described later) supplied from control unit 50 to server 4 through Internet 1 under the control of control unit 50. Also, transmitting/reception unit 51, under the control of control unit 50, receives incoming encrypted distribution data and encrypted key updating key Kux(i) transmitted from server 4 through Internet 1 and supplies these respectively to data decryption unit 52 and key decryption unit 53.

Key decryption unit 53 decrypts the encrypted key updating key Kux(i) transmitted from server 4 using group session key Kgr(i) and holds the key updating key Ku(i) obtained by this decryption. The key updating key Ku(i) obtained by decryption may be supplied to key generating unit 56 and held.

Key generating unit 56 receives key updating key Ku(i) held by key decryption unit 53 and generates the next group session key Kgr(i+1) from this and key updating key Ku(i) and the group session key Kgr(i) corresponding to this. Also, key generating unit 56 holds the currently active group session key Kgr(i) and the group session key Kgr(i+1) which will next become active.

Data decryption unit 52 decrypts the encrypted distribution data transmitted from server 4 using the currently active group session key Kgr(i) that is held by key generating unit 56 and supplies the decrypted distribution data to output unit 54.

Output unit 54 is constituted of a display device (CRT display/liquid crystal display or the like) and/or speakers etc and outputs the distribution data supplied from data decryption unit 52. The user of client 5c can thereby view/listen to etc the distribution data. The distribution data could also be stored in a storage device (not shown) such as a hard disk of client 5c before being output by output unit 54.

As will be described later, the group session keys Kgr(i) and Kgr(i+1) stored in key generating unit 56 are deleted (or destroyed) by control unit 50 in response to withdrawal of client 5c from the data distribution service.

Figure 10:
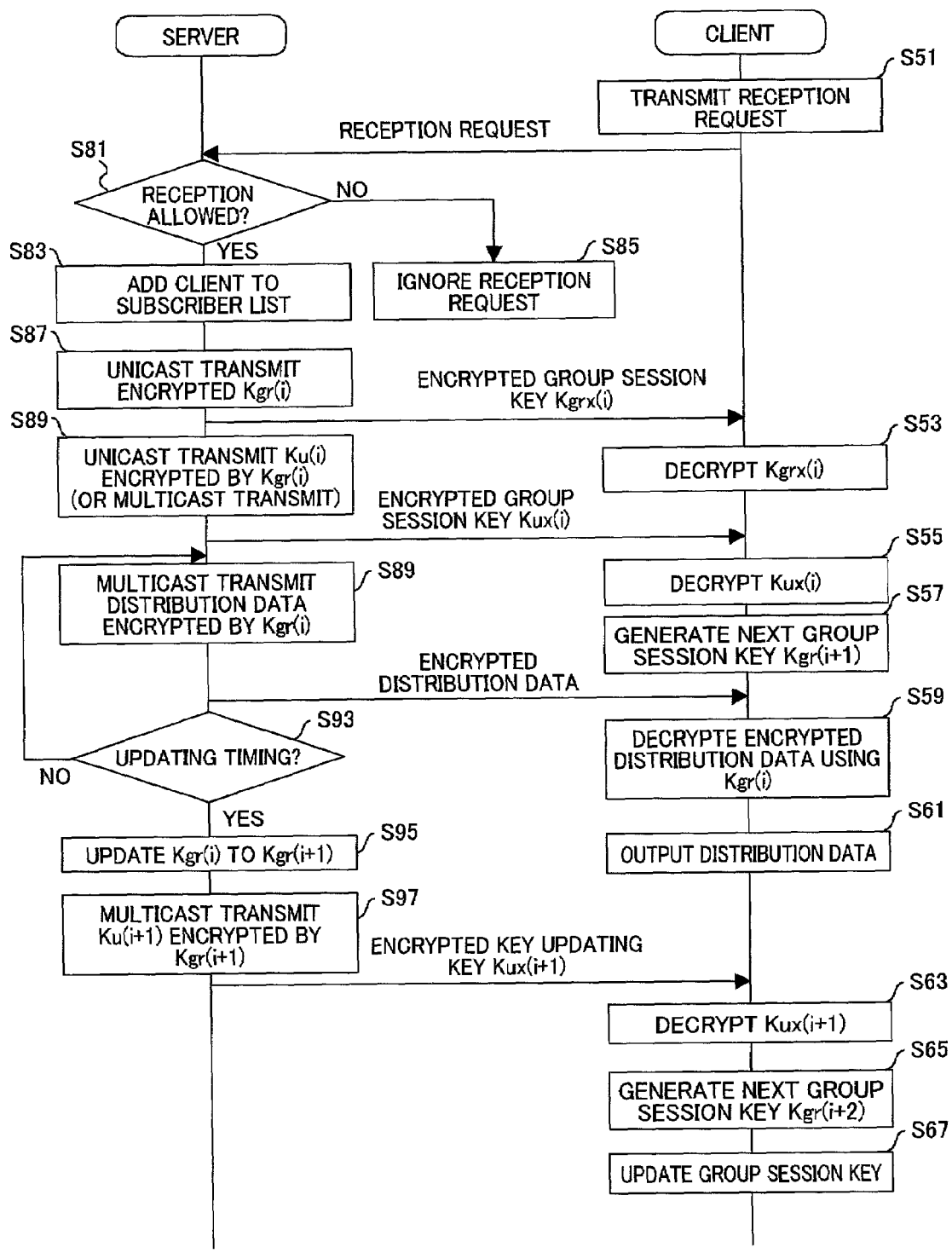
FIG. 10 is a sequence diagram of illustrating the flow of processing of a server and a client belonging to the multicast group.

FIG. 10 is a sequence diagram of illustrating the flow of processing of server 4 and a client belonging to the multicast group 5 (in this case assumed to be client 5c). The processing shown in this sequence diagram describes the case where a client 5c which has not yet subscribed to the data distribution service of server 4 subscribes to this data distribution service.

First of all, the control unit 50 of client 5c performs the subscription procedure of the data distribution service in accordance with user instructions supplied through input unit 55 of client 5c. This subscription procedure is performed by control unit 50 transmitting a reception request to server 4 through transmitting/reception unit 51 and Internet 1 (step S51). This transmission request includes the client name of client 5c.

The reception request is supplied to control unit 40 through transmitting/reception unit 43 of server 4. Control unit 40 determines whether or not to allow reception (step S81) by ascertaining whether the client name included in the reception request is that of a client belonging to the multicast group 5 and whether this client is not subscribed to the data distribution service.

Control unit 40 permits reception (step S81: YES) for clients belonging to the multicast group 5 whose client name is contained in the reception request and which were not subscribed to the data distribution service; otherwise it does not permit reception (step S81: NO).

If reception is not permitted, control unit 40 ignores the reception request (step S85). The condition that client 5c cannot view/listen to the distributed data therefore continues.

If reception is permitted, control unit 40 generates a list cell of the subscription list for client 5c and adds this list cell that has been generated to the subscriber list of subscriber list database 46 (step S83). In the "client name" column of this list cell, the client name included in the reception request is stored; in the "date and time of subscription" the date and time of reception of the reception request (or the date and time of generation of the list cell/date and time of registration on database 46 etc) is stored.

Next, control unit 40 (or key encryption unit 42) encrypts the group session key (let this be Kgr(i)) that is active at the time point of reception of the reception request and transmits this (step S87) by unicasting to client 5c through transmitting/reception unit 43. Example methods for this encryption include encrypting the group session key Kgr(i) by server 4 with common key Kc and encrypting this common key Kc using the public key Kp of client 5c before transmitting the encrypted Kgr(i) (i.e., Kgrx(i)) and encrypted Kc to client 5c. Client 5c uses secret key Ks to decrypt the encrypted common key Kc and further decrypts the encrypted group session key Kgrx(i) using common key Kc, to obtain the group session key Kgr(i) (step S53).

Next, key encryption unit 42 uses the group session key Kgr (i) to encrypt the key updating key Ku(i), thereby generating an encrypted key updating key Kux(i), and transmits this encrypted key updating key Kux(i) to client 5c by unicasting (step S89).

Next, data encryption unit 41 encrypts the distribution data stored in content database 44 using group session key Kgr(i) and transmits this encrypted distribution data to the multicast group 5 by multicasting (step S91). If the transmission time (step S89) of unicasting of the encrypted key updating key Kux(i) corresponds to the key updating time (updating timing) of another client (other clients), transmission of this encrypted key updating key Kux(i) to multicast group 5 may be effected by multicasting rather than transmission solely to client 5c by unicasting.

The key decryption unit 53 of client 5c decrypts the encrypted key updating key Kux(i) using group session key Kgr(i) and holds the decrypted key updating key Ku(i) (step S55). Next, key generating unit 56 generates the next group session key Kgr(i+1) by applying the key decryption key Ku(i) held in key decryption unit 53 to group session key Kgr(i) and holds this (step S57).

Data decryption unit 52 uses the group session key Kgr(i) to decrypt the encrypted distribution data and supplies the distribution data obtained by this decryption to output unit 54 (step S59). Output unit 54 outputs the distribution data and thereby enables the user of client 5c to view/listen to the distribution data (step S61).

The distribution data is encrypted and transmitted (step S93: N0, S91) using this group session key Kgr(i) in server 4 until the key updating timing arrives, at intervals of time T1.

When the key updating timing arrives (step S93: YES), control unit 40 updates (step S95) the group session key Kgr(i) to the next group session key Kgr(i+1).

Next, key encryption unit 42 encrypts the key updating key Ku(i+1) corresponding to group session key Kgr(i+1) using group session key Kgr(i+1) and transmits the encrypted key updating key Kux(i+1) obtained by this encryption to the multicast group 5 by multicasting (step S97).

When transmitting/reception unit 51 of client 5c receives this encrypted key updating key Kux(i+1), control unit 50 instructs key generating unit 56 to update the group session key Kgr(i) to the next group session key Kgr(i+1). Subsequently, data decryption unit 52 uses group session key Kgr(i+1) to decrypt the encrypted distribution data. The group session key Kgr(i) and key updating key Ku(i) that were used immediately previously are deleted (or destroyed) by control unit 50.

Also, simultaneously with this, key decryption unit 53 uses the group session key Kgr(i+1) to decrypt the encrypted key updating key Kux(i+1). Key generating unit 56 generates and holds the next group session key Kgr(i+2) by applying this key updating key Ku(i+1) obtained by decryption to the group session key Kgr(i+1).

The same processing is performed in respect of other clients belonging to multicast group 5 and that have subscribed to the data distribution service.

This updating of the group session key is repeated at intervals of time T1. In this way, it is made difficult for a third party who is not subscribed to the data distribution service to decrypt the distribution data so as to view/listen to it, thereby guaranteeing high secrecy of the distribution data.

In contrast, when client 5c withdraws from the data distribution service, in the same way as the first embodiment described above, control unit 50 deletes (destroys) (not shown in FIG. 10) all of the concurrently active group session key and next group session key and key updating key stored in key generating unit 56. Thus, client 5c is thereafter unable to decrypt encrypted distribution data and is also unable to update subsequent group session keys. As a result, the user of client 5c cannot view/listen to distribution data after withdrawal.

Control unit 50 then sends (not shown in FIG. 10) the deletion value and the client name to server 4. As the deletion value, the result of performing prescribed calculation (calculation using a prescribed equation, hash calculation etc) on identification information of client 5c (for example its IP address) can be employed or, in the same way as in the first embodiment, the result of performing a prescribed calculation on the index number or the result of performing a prescribed calculation on the date and time of transmission of the withdrawal request etc could be employed.

Server 4 ascertains whether the deletion value is legitimate or not and, if it is legitimate, deletes (not shown in FIG. 10) the list cell of client 5c that sent the deletion value from the subscriber list of subscriber data base 46. If the deletion value is not legitimate, server 4 issues a warning (not shown in FIG. 10) to the client 5c that transmitted the deletion value. In this way, server 4 is able to accurately identify subscribers that have subscribed to the data distribution service and can perform charging for the data distribution service appropriately. The method of charging can be the same as in the case of the first embodiment described above.

It should be noted that, if the transmissions shown in step S87 and S89 shown in FIG. 10 are both performed by unicasting, transmission could be performed simultaneously by a single transmission of the encrypted group session key Kgrx and encrypted key updating key Kux. Also, in step S53 and/or step S55, if reception by client 3c is unsuccessful, server 4 can be made to retransmit by sending a retransmission request to server 4.

Also, at fixed time intervals T2 (T1), the currently active group session key can be converted to another group session key not in a correlated relationship with this group session key by performing unicast communication between server 4 and the clients subscribed to the data distribution service. In this way, even if a client that was not subscribed to the data distribution service has illegally acquired encrypted key Kgr, this client can be prevented from decrypting data relating to the data distribution service.

OTHER EMBODIMENTS

The Internet 1 in the first and second embodiments could be an intranet.

Also, the content database 24 (44) and subscriber list database 25 (46) in the first and second embodiments, instead of being on the same server, could be respectively held and managed on separate servers. In this case, a client belonging to multicast group 3 (5) performs registration of subscription to the data distribution service with the server (subscriber management server) that holds the subscriber list database 25 (46) and receives data relating to the data distribution service from a server (data server) that holds the content database 24 (44). It can be arranged for a client that is subscribed to the server to receive the group session key and key updating key etc from the subscriber management server or to receive these from the data server. Likewise, charging of the service fee may be conducted by the subscriber management server or may be conducted by the data server.

The processing of the server 2 and distribution data receiving device 300 in the first embodiment may be realized by hardware circuitry or may be realized by a program and a CPU or microcomputer that executes this program. Preferably, however, as described above, the key decryption key Km of distribution data receiving device 300 is formed by a hardware circuit or IC chip.

Likewise, the processing of server 4 and client 5 in the second embodiment may be realized by hardware circuitry or may be realized by a program and a CPU or microcomputer that executes this program.

According to the present invention, in multicast communication, data encryption can be appropriately performed. Also, according to the present invention, the multicast server or the server that manages the subscribers to the data distribution service can ascertain and control which clients, of the clients belonging to the multicast group, are subscribed to the data distribution service. Furthermore, according to the present invention, charging can be performed in accordance with the amount of data received from subscription to withdrawal or quantity-based charging with fine gradations can be performed by performing charging in accordance with the time from subscription to withdrawal.

What is claimed is:

1. A multicast communication system having a multicast server for transmitting data relating to a prescribed data distribution service by multicasting, and a plurality of clients belonging to a multicast group and receiving said data, said multicast server comprising:
a data encryption unit for encrypting said data by using a first encryption key;
a data transmission unit for transmitting said data encrypted by said data encryption unit to said plurality of clients by multicasting;
a key encryption unit for encrypting said first encryption key by using a second encryption key;
a key transmission unit for transmitting said first encryption key encrypted by said key encryption unit by unicasting to at least one of the plurality of clients, said at least one client subscribing to said data distribution service;
a registration unit for registering one of the plurality of clients, that wishes to subscribe to said data distribution service;
a deletion data reception unit for receiving deletion data indicating that the client registered by said registration unit has been deleted at least said first encryption key held by said client itself, said deletion data being transmitted from said client; and
an erasure unit for erasing from said registration unit the client that has transmitted said deletion data, when said deletion data reception unit receives said deletion data; and said at least one client comprising:
a key reception unit for receiving said encrypted first encryption key transmitted by said transmission unit;
a key decryption unit for decrypting said encrypted first encryption key received by said key reception unit, using a decryption key;
a data decryption unit for decrypting the encrypted data transmitted by said data transmission unit, using the first encryption key obtained by said decryption unit;
a deletion unit for deleting at least said first encryption key held by said client itself in the event of withdrawal from said data distribution service; and
a deletion data transmission unit for generating said deletion data and transmitting said deletion data to said multicast server.

2. The multicast communication system according to claim 1, wherein said multicast server further comprises a charging unit for applying quantity-based charges to said at least one client in accordance with the time or quantity of data received.

3. The multicast communication system according to claim 1, wherein said second encryption key and said decryption key are the same key.

4. The multicast communication system according to claim 3, wherein both said second encryption key and said decryption key are separately provided in respective clients subscribed to said data distribution service.

5. The multicast communication system according to claim 3, wherein said decryption key is constituted of hardware circuitry or a semiconductor chip.

6. The multicast communication system according to claim 1, wherein said second encryption key is a key that is obtained by said at least one client encrypting said first encryption key using a public key of said multicast server and transmitting said encrypted first encryption key to said multicast server, and said multicast server decrypting said encrypted first encryption key using its own secret key.

7. The multicast communication system according to claim 1, wherein said second encryption key is a public key of a digital certificate issued by the public key infrastructure in respect of a client that has subscribed to said data subscription service, and said decryption key is a secret key of said digital certificate.

8. A multicast communication method carried out between a multicast server for transmitting data relating to a prescribed data distribution service by multicasting, and a client subscribed to said data distribution service of a plurality of clients that receive said data and belong to the multicasting group, said multicast communication method comprising steps of:
encrypting a first encryption key used in encryption of said data by using a second encryption key in said multicast server;
transmitting said encrypted first encryption key by unicasting to at least one of said plurality of clients in said multicast server, said at least one client subscribing to said data distribution service;
decrypting said encrypted first encryption key by using a decryption key, on receiving the encrypted first encryption key transmitted by said unicasting in said at least one client;
encrypting said data using said first encryption key in said multicast server;
transmitting said encrypted data by multicasting to the plurality of clients in said multicast server;
decrypting said encrypted data by using said first encryption key obtained by decryption of said decryption key on receipt of said encrypted data in said at least one client;
registering one of the plurality of clients, that wishes to subscribe to said data distribution service, in said multicast server;
receiving deletion data indicating that the registered client has been deleted at least said first encryption key held by said client itself, said deletion data being transmitted from said client;
erasing the client that has transmitted said deletion data, when said deletion data reception unit receives said deletion data, in said multicast server;
deleting in said client at least said first encryption key held by said client itself in the event of withdrawal from said data distribution service; and
generating said deletion data and transmitting said deletion data from said client to said multicast server.

9. A multicast data transmission device comprising:
a data encryption unit for encrypting data relating to a prescribed data distribution service by using a first encryption key;

a data transmission unit for transmitting said data encrypted by said data encryption unit by multicasting to clients belonging to a prescribed multicast group by multicasting;

a key encryption unit for encrypting said first encryption key by using a second encryption key;

a key transmission unit for transmitting the first encryption key encrypted by said key encryption unit by unicasting to at least one of the clients belonging to said multicast group, said at least one client subscribing to said data distribution service;

a registration unit for registering one of the plurality of clients, that wishes to subscribe to said data distribution service;

a deletion data reception unit for receiving deletion data indicating that the client registered by said registration unit has been deleted at least said first encryption key held by said client itself, said deletion data being transmitted from said client; and an erasure unit for erasing from said registration unit the client that has transmitted said deletion data, when said deletion data reception unit receives said deletion data.

10. A multicast data transmission method for transmitting data relating to a prescribed data distribution service to clients belonging to a prescribed multicast group by multicasting, comprising steps of:

encrypting a first encryption key used in encrypting said data, by using a second encryption key;

transmitting said encrypted first encryption key by unicasting to at least one of the clients belonging to said multicasting group, said at least one client subscribing to said data distribution service;

encrypting said data by using said first encryption key;

transmitting said encrypted data to the clients belonging to said multicast group by multicasting;

registering one of the plurality of clients, that wishes to subscribe to said data distribution service, in said multicast server;

receiving deletion data indicating that the registered client has been deleted at least said first encryption key held by said client itself said deletion data being transmitted from said client; and erasing the client that has transmitted said deletion data, when said deletion data reception unit receives said deletion data, in said multicast server.

11. A multicast data receiving device for receiving data relating to a prescribed data distribution service transmitted by multicasting, comprising:

a key decryption unit for decrypting a encrypted first encryption key obtained by subscribing to said data distribution service;

a data reception unit for receiving said data encrypted by using said first encryption;

a data decryption unit for decrypting the encrypted data received by said data reception unit, by using the first encryption key obtained by decryption of said key decryption unit;

a deletion unit for deleting at least said first encryption key held in the event of withdrawal from said data distribution service; and a deletion data transmission unit for generating deletion data and transmitting deletion data to said multicast server.

12. A multicast data receiving method for receiving data relating to a prescribed data distribution service, said data being transmitted by multicasting, comprising steps of:

decrypting an encrypted first encryption key obtained by subscribing to said data distribution service;

receiving said data encrypted by using said first encryption key;

decrypting said received and encrypted data using the first encryption key obtained by said decryption;

deleting at least said first encryption key in the event of withdrawal from said data distribution service; and generating said deletion data and transmitting said deletion data to said multicast server.

13. A multicast communication system having a multicast server for transmitting data relating to a prescribed data distribution service by multicasting and a plurality of clients belonging to a multicast group and that receive said data, said multicast server comprising:

a key updating unit for updating a data encryption key for encrypting said data, at intervals of a prescribed updating timing, to a data encryption key that is valid after the updating timing, said data encryption key that is valid after the updating timing being in a relationship that is obtained by applying an updating key corresponding to a data encryption key that is valid before the updating timing to the data encryption key that is valid before the updating timing;

an updating key holding unit for generating or holding in advance said updating key;

a data encryption unit for encrypting said data using a data encryption key that is valid currently;

a data transmission unit for transmitting said data encrypted by said data encryption unit to said plurality of clients by multicasting;

a key encryption unit for encrypting the updating key corresponding to the data encryption key that is valid after the updating timing, at intervals of said updating timing, using the data encryption key that is valid after the updating timing;

an updating key transmission unit for transmitting the updating key encrypted by said key encryption unit to at least one of said plurality of clients by unicasting or multicasting at intervals of said updating timing, said at least one client subscribing to said data distribution service;

a registration unit for registering one of the plurality of clients, that wishes to subscribe to said data distribution service;

a deletion data reception unit for receiving deletion data indicating that the client registered by said registration unit has been deleted at least said first encryption key held by said client itself said deletion data being transmitted from said client; and an erasure unit for erasing from said registration unit the client that has transmitted said deletion data, when said deletion data reception unit receives said deletion data; and said at least one client comprising:

a data reception unit for receiving the encrypted data transmitted by said data transmission unit;

a data decryption unit for decrypting said encrypted data received by said data reception unit, using a data decryption key that is valid currently that is the same as said data encryption key that is valid currently;

an updating key reception unit for receiving the encrypted updating key transmitted by said updating key transmission unit;

an updating key decryption unit for decrypting the encrypted updating key received by said updating key reception unit, using said data decrypting key that is valid currently;

a data decryption key updating unit for updating a data decryption key that is valid before said updating timing to a data decryption key that is valid after the updating timing, at intervals of the updating timing, said data decryption key that is valid after the updating timing being generated by applying an updating key obtained by decryption using a data decryption key that is valid before the updating time to said data decryption key that is valid before the updating timing, a data decryption key on subscribing to said data distribution service being given from outside;

a deletion unit for deleting at least said first encryption key held by said client itself in the event of withdrawal from said data distribution service; and a deletion data transmission unit for generating said deletion data and transmitting said deletion data to said multicast server.

14. A multicast communication method carried out between a multicast server for transmitting data relating to a prescribed data distribution service by multicasting and at least one of a plurality of clients for receiving said data and belonging to the multicasting group, said at least one client subscribing to said data distribution service, comprising steps of:

encrypting said data by using a data encryption key that is currently valid in said multicast server;

transmitting said encrypted data to said plurality of clients by multicasting in said multicast server;

decrypting said encrypted data by using a currently valid data decryption key that is the same as said currently valid data encryption key on receiving the encrypted data transmitted from said multicasting server in said at least one client;

updating the data encryption key, at intervals of a prescribed updating timing, to a data encryption key that is valid after the updating timing in said multicast server, said data encryption key that is valid after the updating timing being in a relationship that is obtained by applying an updating key corresponding to a data encryption key that is valid before the updating timing to the data encryption key that is valid before the updating timing;

encrypting said updating key corresponding to the data encryption key that is valid after the updating timing by using the data encryption key that is valid after the updating timing at intervals of said updating timing, and transmitting the encrypted updating key to said at least one client by unicasting or multicasting in said multicast server;

decrypting the encrypted updating key by using a currently valid data decryption key on receiving the encrypted updating key transmitted from said multicasting server in said at least one client;

updating a data decryption key that is valid before the updating timing to a data decryption key that is valid after the updating timing at intervals of the updating timing in said at least one client, said data decryption key that is valid after the updating timing being generated by applying an updating key obtained by decryption using a data decryption key that is valid before the updating time to said data decryption key that is valid before the updating timing at said intervals, a data decryption key on subscribing to said data distribution service being given from outside;

registering one of the plurality of clients, that wishes to subscribe to said data distribution service, in said multicast server;

receiving deletion data indicating that the registered client has been deleted at least said first encryption key held by said client itself said deletion data being transmitted from said client;

erasing the client that has transmitted said deletion data, when said deletion data reception unit receives said deletion data, in said multicast server;

deleting in said client at least said first encryption key held by said client itself in the event of withdrawal from said data distribution service; and generating said deletion data and transmitting said deletion data from said client to said multicast server.

15. A multicast data transmission device, comprising:

a key updating unit for updating a data encryption key for encrypting data relating to a prescribed data distribution service, at intervals of a prescribed updating timing, to a data encryption key that is valid after the updating timing, said data encryption key that is valid after the updating timing being in a relationship that is obtained by applying an updating key corresponding to a data encryption key that is valid before the updating timing to the data encryption key that is valid before the updating timing;

an updating key holding unit for generating or holding in advance said updating key;

a data encryption unit for encrypting said data using a data encryption key that is valid currently;

a data transmission unit for transmitting said data encrypted by said data encryption unit to clients belonging to a prescribed multicast group by multicasting;

a key encryption unit for encrypting the updating key corresponding to the data encryption key that is valid after the updating timing, at intervals of said updating timing, using the data encryption key that is valid after the updating timing;

an updating key transmission unit for transmitting the updating key encrypted by said key encryption unit to said at least one of clients by unicasting or multicasting at intervals of said updating timing;

a registering unit for registering one of the plurality of clients, that wishes to subscribe to said data distribution services;

a deletion data reception unit for receiving deletion data indicating that the client registered by said registration unit has been deleted at least said first encryption key held by said client itself, said deletion data being transmitted from said client; and an erasure unit for erasing from said registration unit the client that has transmitted said deletion data, when said deletion data reception unit receives said deletion data.

16. A multicast data transmission method for transmitting data relating to a prescribed data distribution service to clients belonging to a prescribed multicast group by multicasting, comprising steps of:

encrypting said data by using a data encryption key that is valid currently;

transmitting the encrypted data to the clients by multicasting;

updating the data encryption key, at intervals of a prescribed updating timing, to a data encryption key that is valid after the updating timing, said data encryption key that is valid after the updating timing being in a relationship that is obtained by applying an updating key corresponding to a data encryption key that is valid before the updating timing to the data encryption key that is valid before the updating timing;

encrypting said updating key corresponding to the data encryption key that is valid after the updating timing by using the data encryption key that is valid after the updating timing at intervals of said updating timing;

transmitting the encrypted updating key to at least one of said clients by unicasting or multicasting;

registering one of the plurality clients that wishes to subscribe to said data distribution service;

receiving deletion data indicating that the registered client has been deleted at least said first encryption key held by said client itself, said deletion data being transmitted from said client; and erasing the client that has transmitted said deletion data, when said deletion data reception unit receives said deletion data.

17. A multicast data receiving device for receiving data relating to a prescribed data distribution service, said data being transmitted by multicasting from a multicast server, comprising:

a data reception unit for receiving said data encrypted by a data encryption key that is currently valid, of data encryption keys that are updated at intervals of a prescribed updating timing;

a data decryption unit for decrypting said encrypted data received by said data reception unit, using a data decryption key that is currently valid, said data decryption key being the same as said data encryption key that is currently valid;

an updating key reception unit for receiving from said multicast server a result of encrypting an updating key by using said data encryption key that is currently valid, said updating key being employed for updating said data decryption key;

an updating key decryption unit for decrypting said result received by said updating key reception unit, using said data decrypting key that is currently valid;

a data decryption key updating unit for updating, at intervals of a prescribed updating timing, a data decryption key that is valid before said updating timing to a data decryption key that is valid after the updating timing, said data decryption key that is valid after the updating timing being generated by applying an updating key obtained by decryption using a data decryption key that is valid before the updating time to said data decryption key that is valid before the updating timing, a data decryption key on subscribing to said data distribution service being given from outside;

a deletion unit for deleting at least said first encryption key held in the event of withdrawal from said data distribution service, and a deletion data transmission unit for generating deletion data and transmitting deletion data to said multicast server.

18. A multicast data receiving method for receiving data relating to a prescribed data distribution service transmitted by multicasting from a multicast server, comprising steps of:

receiving said data encrypted by a data encryption key that is currently valid, of data encryption keys that are updated at intervals of a prescribed updating timing;

decrypting the encrypted data by using a decryption key that is currently valid, said decryption key being the same as said data encryption key that is currently valid;

receiving from said multicast server, a result of encrypting an updating key by using said data encryption key that is currently valid, said updating key being employed for updating said data decryption key;

decrypting said result by using said data decrypting key that is currently valid;

updating a data decryption key that is valid before the updating timing to a data decryption key that is valid after the updating timing at intervals of the updating timing, said data decryption key that is valid after the updating timing being generated by applying an updating key obtained by decryption using a data decryption key that is valid before the updating timing to said data decryption key that is valid before the updating timing at said intervals, a data decryption key on subscribing to said data distribution service being given from outside;

deleting at least said first encryption key in the event of withdrawal from said data distribution service; and generating said deletion data and transmitting said deletion data to said multicast.

* * * * *